Jan. 16, 1940.　　　　G. C. ABBE　　　　2,187,509
CONTROL SEAT
Filed Nov. 23, 1938　　　3 Sheets-Sheet 1

INVENTOR
BY George C. Abbe.
Dike, Calver & Gray
ATTORNEYS.

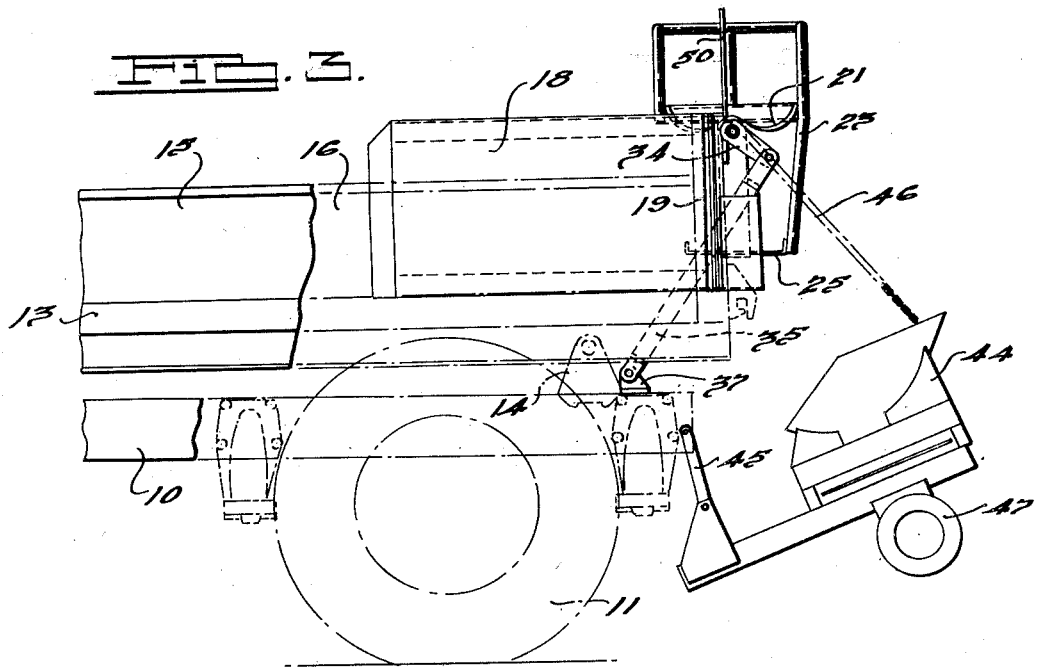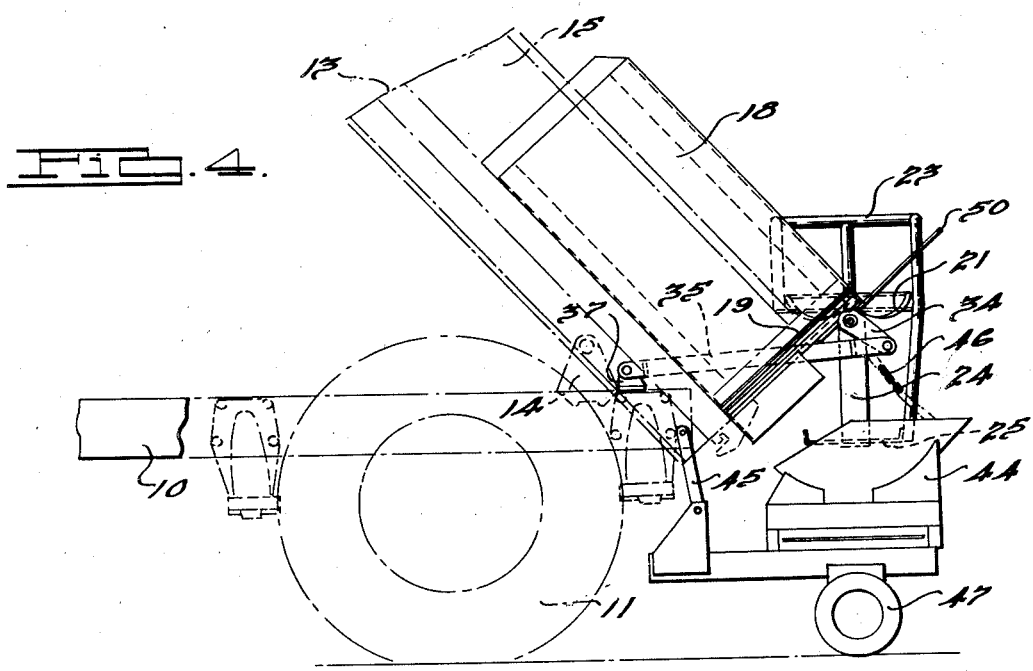

Jan. 16, 1940.  G. C. ABBE  2,187,509
CONTROL SEAT
Filed Nov. 23, 1938  3 Sheets-Sheet 3
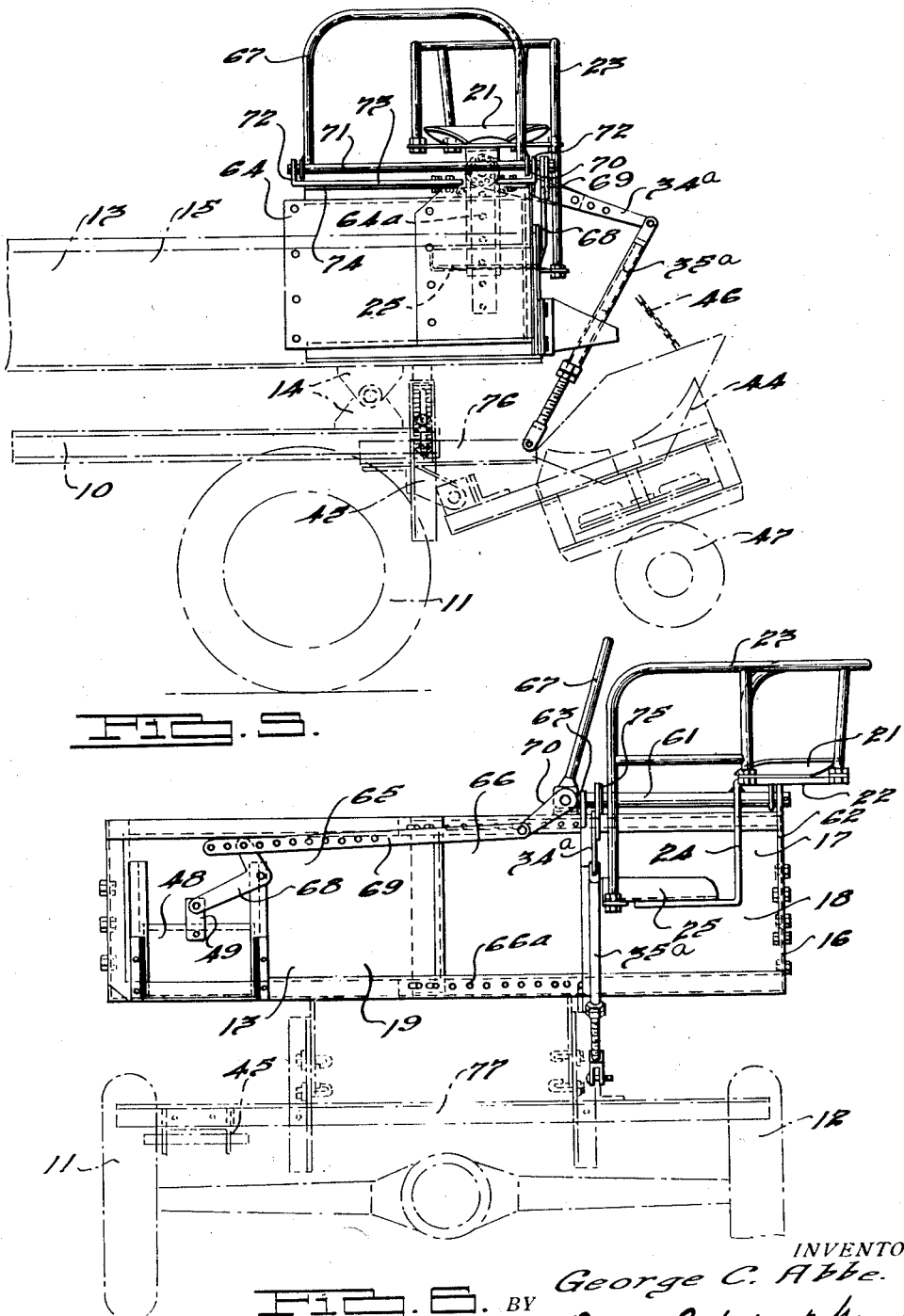
INVENTOR
George C. Abbe.
BY Dike, Calver & Gray
ATTORNEYS.

Patented Jan. 16, 1940

2,187,509

UNITED STATES PATENT OFFICE 2,187,509

CONTROL SEAT

George C. Abbe, Swarthmore, Pa., assignor to Good Roads Machinery Corporation, Kennett Square, Pa., a corporation of Pennsylvania Application November 23, 1938, Serial No. 242,058

14 Claims. (Cl. 298—1)

This invention relates to an operator's control seat for use on vehicles of the tiltable body type. More particularly the invention relates to a seat or other operator's station which is mounted on the vehicle body and frame in such a manner as to rigidly maintain its normal horizontal position regardless of the position or angle of inclination assumed by the body.

In the use of dump trucks and similar vehicles, particularly when employed in combination with trailer equipment such as sand or gravel spreaders, it is generally necessary to station an operator at the rear end of the truck to control and otherwise oversee the operation of the trailer or other apparatus. At present the operator of such equipment either rides on the trailer or in the dump body itself. It is generally recognized, however, that such practices are decidedly unsafe, and many state highway departments have adopted regulations prohibiting the operator from riding on the spreader or other trailer device. Although riding in the dump body of the vehicle is relatively less dangerous, this method of control is undesirable in view of the operator's position when the body is raised or tilted which prevents ready visibility of the road surface and which is also difficult to maintain.

It is accordingly an important object of the present invention to provide an operator's seat or station on the rear end of dump truck bodies which will permit the operator to control the movement or operation of either or both the dump body and trailer apparatus with a maximum of personal safety.

Another object of the invention is to provide a seat, platform or the like which is pivotally supported on the rear end of the dump body in such a manner as to maintain a substantially constant horizontal position regardless of the position or angle of inclination of the dump body.

A further object of the invention is to provide an operator's control seat which is pivotally mounted on the dump body, yet rigidly maintained in its normal horizontal position by means of suitable linkage connections to the vehicle frame or chassis.

A further object of the invention is to provide a control seat such as hereinbefore referred to which is adequately protected by means of railings or the like and provided with a rigid platform upon which the operator may stand, if desired or necessary.

A still further object of the invention is to provide a seat or platform which is so positioned and mounted on the vehicle body as to permit the operator to readily control the trailer apparatus and at the same time observe road conditions both forwardly and rearwardly of the vehicle.

Other objects of this invention will appear in the following description and appended claims, reference being had to the accompanying drawings forming a part of this specification wherein like reference characters designate corresponding parts in the several views.

Fig. 3 is a side elevational view of the vehicle and seat shown in Figs. 1 and 2, and also shows a spreader apparatus of the type which may be employed for spreading materials in the wake of the vehicle, the vehicle body being shown in horizontal position with the spreader held away from the ground in its inoperative position.

Fig. 4 is a view similar to Fig. 3, but showing the body in raised or tilted position with the spreader resting on the ground in position for operation.

Fig. 5 is a side view similar to Fig. 3, but showing a modified arrangement of the seat and its supporting elements as well as a modified form of gate lift lever.

Fig. 6 is a rear view of the vehicle, seat, and gate lifting means shown in Fig. 5.

Figure 1:
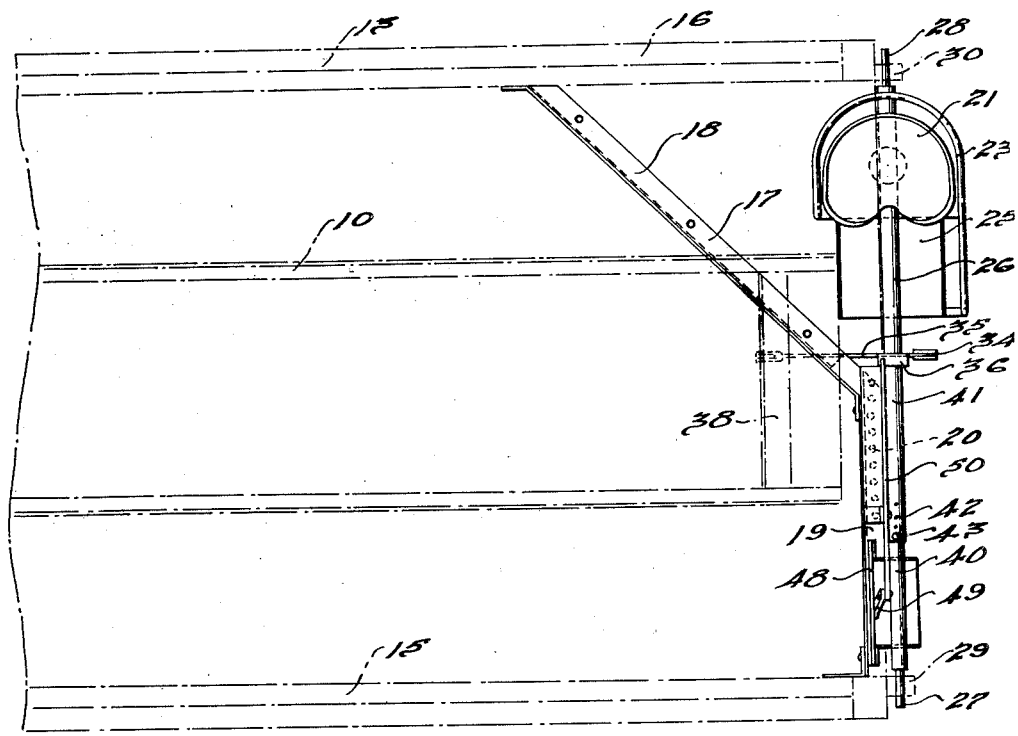
Figs. 1 and 2 are plan and rear views respectively of the rear portion of a vehicle frame and body provided with a control seat constituting one embodiment of the present invention.
Figure 2:
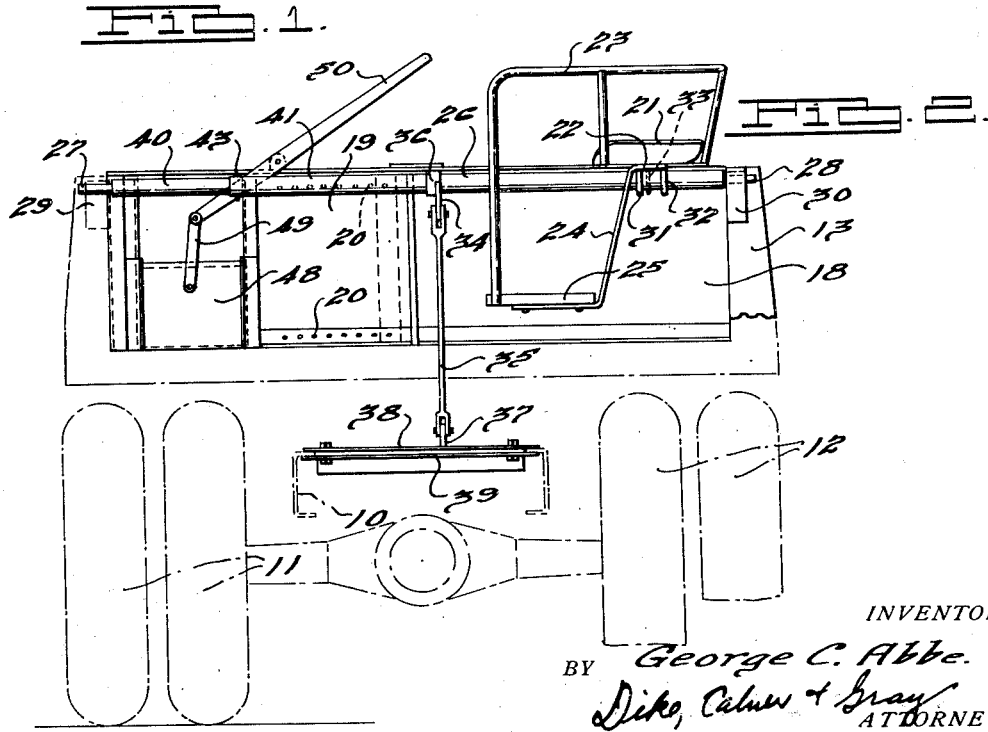

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In general the present invention is utilized in combination with a vehicle of the tiltable body type, which in the present instance comprises a frame 10, rear wheels 11 and 12, and a tiltable body 13 which is pivotally mounted on plates 14 fastened to the rear portion of frame 10. The body 13 is provided with side panels 15 and 16 and a rear member 17 comprising a deflector plate 18 and a gate plate 19, which may be provided with a plurality of apertures 20 along its length to permit the adaptation of rear member 17 to varying body widths.

The seat and platform arrangement shown in

Figs. 1 to 4, which merely constitutes one embodiment of the present invention, comprises a seat portion 21 supported on the bent metal strap member 22 and having fastened thereto a suitable railing frame and back support of metal tubing 23. The strap member 22 has a depending portion 24 upon which a platform 25 is supported for the additional safety and comfort of the operator. The railing frame 23 is also preferably fastened to platform 25 to increase the strength of the entire seat and frame structure.

Although the above described seat and platform arrangement may be mounted in various positions on the vehicle body, it is advantageous to mount it on a horizontal shaft or rod such as shown at 26 in the drawings. The shaft 26 is provided with hinge pins 27 and 28 at each end, which are preferably received in the apertured ears 29 and 30 normally used for supporting the tail gate and thus permit rotation of rod 26 about its own longitudinal axis. The seat 21 is supported on shaft 26 by means of strap member 22 which has a pair of depending plates 31 and 32 provided with apertures capable of snugly receiving the shaft. A pin 33 is also utilized to prevent relative rotation or shifting of the seat and shaft.

To maintain seat 21 and platform 25 in a substantially horizontal position regardless of the angle of inclination assumed by body 13, shaft 26 is connected by means of the links 34 and 35 to the frame 10. Link 34 is integral with a collar 36, which is keyed or otherwise rigidly fastened to shaft 26. At its outer end link 34 is pivotally connected with the upper end of link 35, which in turn is pivoted at its lower end to the bracket 37 supported on cross bars 38 and 39 bolted to frame 10. It can be readily seen from the drawings that as the body 13 is inclined the links 34 and 35 accommodate themselves to any change of position, and in view of the arrangement as shown retain seat 21 in substantially its normal horizontal position at all times.

Shaft 26 is preferably made in two telescopically interfitting parts 40 and 41, as shown in Fig. 1, each of which is provided with a series of apertures, such as 42. Shaft 26 is thus made adjustable to fit any desired width of vehicle, the parts 40 and 41 being telescopically adjustable to the length desired by means of the pin 43. Similar apertures may be provided in shaft 26 for the pin 33 which retains seat 21 in place, thereby permitting transverse adjustment of the position of the seat along the rear end of the body. In this connection, it should be observed that seat 21 is preferably positioned on one side of the vehicle, so as to permit the attachment of the spreader or other trailer mechanism 44 to the other side of the vehicle, where it may be readily observed while operating.

The trailer 44 may be of any desired construction, and is adapted to be connected with frame 10 by means of the link 45. Its rear portion is connected with the body 13 by means of the chain 46, which is of such length as to raise the wheels 47 of the spreader from the ground, when the body is in horizontal position. When the body is tilted, however, the chain becomes slack and permits the trailer to assume its normal operating position with the wheels 47 in tractive engagement with the ground.

Although it would be possible to use a swinging tail gate of the usual type at the rear end of the body 13, it has been found preferable, particularly in the spreading of sand, to form the rear end of stationary deflector and gate plates, such as 18 and 19, which are bolted in any suitable manner to the body. The plate 19 is provided with a vertically slidable gate 48, which may be readily opened and closed by the operator with the aid of the link 49 and the pivoted lever 50.

Another advantageous arrangement of the rear member 17 and associated seat support is shown in Figs. 5 and 6. According to these figures the seat 21 and its supporting strap 22 are fixedly mounted on a relatively short shaft 61 of predetermined and fixed length. The shaft 61 is rotatably mounted in the upper portion of the upright bar 62 and in the bearing plate 63 fastened to the upper portion of the plate 64 which extends between the deflecting plate 18 and the gate plate 19 and constitutes a portion of the rear member 17. The bar 62 is provided with vertically spaced apertures 64a to permit its vertical adjustment on the panel 16 to which it is fastened. This renders it possible to use the seat interchangeably on vehicle frames having rear members of different height. The bar 62 and plate 63 are also preferably situated sufficiently far forward of the rear end of the body 13 to permit the platform 25 to be substantially above the floor of the body although immediately adjacent the rear end of the vehicle.

It will be observed that according to this form of the invention the strap 22 supporting the seat 21 extends out beyond the side panel 16 of the vehicle body, thereby allowing the operator to obtain a better view of the road in front of the vehicle. Further, the deflector plate 18 is spaced sufficiently far forward to allow room for the seat and platform in the position above the body previously described. The deflector plate 18 also extends substantially parallel instead of diagonally to the gate plate 19 to further facilitate placing the seat in the above manner.

It will also be observed that the gate plate 19 consists of two parts 65 and 66, each of which is provided with spaced apertures 66a along its upper and lower edges to permit adjustment of the effective length of plate 19 and utilization of the rear member 17 with bodies of varying width. Moreover, the gate 48 slidably mounted in plate 19 is operated by a somewhat different lever arrangement in the embodiment of the invention shown in Figs. 5 and 6. Thus, the link 49 is connected with the handle bar 67 by means of the bell crank 68, the adjustable arm 69 and the link 70. The handle bar 67 is fixedly mounted on the shaft 71 which is in turn journalled for rotation in the upwardly extending flanges 72 on the bar 73 fastened to the bracket 74 on the upper edge of the plate 64. The link 70 is keyed or otherwise fastened to the rearward end of shaft 71, and serves together with the arm 69 and crank 68 to translate the rotary or rocking movement of the handle bar 67 into a vertical reciprocation of the link 49 and gate 48. It will thus be seen that the handle bar 67 not only serves as the handle member of an efficient lever arrangement, but constitutes a guard rail serving to further protect the operator in the seat 21.

The links 34a and 35a as shown in Figs. 5 and 6 are adjustable in length, the link 34a being fastened as by bolts to an annular disk or flange 75 keyed or otherwise fastened to the shaft 61, while the link 35a is mounted on the rear end of an extension 76 on the frame 10. Further, the trailer 44 is pivotally connected to the left end of the cross beam 77 connected to the frame 10 to permit drawing the trailer in a path nearer the center of the road.

If desired, the links 34ª and 35ª may be arranged at the side of the vehicle instead of at the end, i. e., by connecting the link 34ª to the right hand end of shaft 61 and the link 35ª to a suitable extension on the frame 10 extending beyond the right hand edge of the body 13. It is preferable, however, to arrange the links 34ª and 35ª in the manner shown.

The operation of the control seat is believed to be clear from the above description and from the drawings from which it will be seen that the construction herein proposed is a substantial safety factor in the operation of dump trucks and trailer equipment, which at the same time permits the operator to obtain a clear view of road conditions both in front of and to the rear of the vehicle, and thus enables him to operate the trailer with greatly increased efficiency. Although the embodiment of the invention shown in Figs. 1 to 4 is exceedingly useful for the purposes contemplated, the arrangement shown in Figs. 5 and 6 is considered preferable, since it not only provides increased safety due to the location and construction of the handle bar but also permits a better view of the road due to the position of the seat partially beyond the side edge of the vehicle body.

I claim:

1. In combination with a vehicle having a frame and a tiltable body, a control seat pivotally mounted on the rear end of said body and connected to said frame and held thereby in a constant substantially horizontal position independently of the position of said tiltable body.

2. In combination with a vehicle having a frame and a tiltable body, a control seat mounted on a rotatable substantially horizontal shaft extending transversely of said body, and linkage connections between said frame and said seat adapted to retain said seat in a substantially horizontal position during changes of inclination of said body.

3. In combination with a vehicle having a frame and a tiltable body, a control seat rigidly mounted on a substantially horizontal shaft rotatably mounted upon and extending transversely of said body adjacent its pivoted rear end, and a link arm pivotally connected to said shaft and said frame and adapted to retain said shaft and seat in a substantially constant horizontal position during movement of said body about its pivots.

4. In combination with a vehicle having a frame and a body pivotally mounted at one end to said frame, a shaft rotatably supported on said body, a control seat rigidly fastened to said shaft, and linkage connecting said shaft and frame whereby said seat maintains a constant substantially horizontal position during rotation of said body about its pivots.

5. In combination with a vehicle having a frame and a tiltable body pivotally mounted at one end to said frame, a rod rotatably mounted on said body adjacent its pivoted end, a control seat rigidly mounted on said rod, and a link arm pivotally connected to said rod and said frame and adapted to retain said seat in a substantially horizontal position during tilting of said body about its pivots.

6. In combination with a vehicle having a frame and a tiltable body pivotally mounted at one end on said frame, a rotatably mounted shaft extending substantially horizontally across the rear end of said body, a control seat rigidly mounted on said shaft, and a toggle lever rigidly connected to said shaft and pivotally connected to said frame and adapted to maintain said seat in a substantially horizontal position.

7. In combination with a vehicle having a frame and a tiltable body pivotally mounted at one end on said frame, a rotatably mounted shaft extending substantially horizontally across the rear end of said body, and an operator's station rigidly mounted on said shaft and adapted to maintain a substantially constant position with relation to the vertical, said station comprising a seat and platform rigidly connected to each other by means of a protective railing.

8. In combination with a vehicle having a frame and a tiltable body pivotally mounted at one end to said frame, a rotatably mounted shaft extending transversely across the rear end of said body and a seat rigidly mounted on said shaft and connected to said frame to hold said seat in its normal substantially horizontal position during movement of said body, said shaft comprising a pair of telescopically interfitting sections capable of being adjustably fastened together at different points to produce shafts of desired predetermined lengths.

9. In combination with a vehicle having a frame and a tiltable body pivotally mounted at one end on said frame, a rotatably mounted shaft extending transversely across the rear end of said body and a seat mounted on said shaft and connected to said frame to hold said seat in its normally horizontal position, said seat being prevented from rotation with respect to said shaft by means of a pin extending through apertures in said seat and said shaft, said shaft being provided with a plurality of said apertures, whereby the position of said seat longitudinally of said shaft may be varied.

10. In combination with a vehicle having a frame and a tiltable body pivotally mounted at one end of said frame and provided at said end with an end wall comprising a gate and a diagonally extending deflector plate; a rotatable shaft extending horizontally between a side wall of said body and said deflector plate, and a seat rigidly mounted on said shaft and connected with said frame in such a manner as to maintain said seat in a substantially horizontal position during tilting of said body, said seat being positioned sufficiently close to said gate to permit control thereof by an operator stationed in said seat.

11. In combination with a vehicle having a frame and a tiltable body pivotally mounted at one end on said frame, a gate in an end wall of said body, a transverse shaft rotatably mounted on said body, a seat rigidly mounted on said shaft and connected to said frame to hold said seat in a substantially horizontal position, and a lever adjacent said seat operatively connected to said gate for opening and closing said gate, said lever comprising a bar of inverted U-shape extending longitudinally of said body substantially in front of said seat.

12. In combination with a vehicle having a frame and a tiltable body pivotally mounted at one end on said frame, a gate in an end wall of said body and positioned adjacent one side of said body, a transverse shaft rotatably mounted on said body slightly forward of said end wall and adjacent the other side of said body, a seat rigidly mounted on said shaft and connected to said frame to hold said seat in a substantially horizontal position, and a lever adjacent said seat operatively connected to said gate, said seat extending beyond the side of said body, whereby an operator situated therein may obtain a view forwardly of said vehicle.

13. In combination with a vehicle having a frame and a body tiltable into a plurality of angularly disposed positions relative to said frame, a support comprising a seat and a platform connected together as a unit and carried by the body at or adjacent an end thereof, and means connecting the frame and support whereby said support will remain in a substantially horizontal position irrespective of the angularity of said body.

14. A control seat structure for a vehicle having a frame and a body tiltable into different angular positions with respect to the frame; said seat structure comprising a seat and a platform having a pivotal connection with said body, and means interconnecting said seat structure and frame whereby the seat will maintain a substantially horizontal position irrespective of the angularity of the body with relation to said frame.

GEORGE C. ABBE.